United States Patent Office

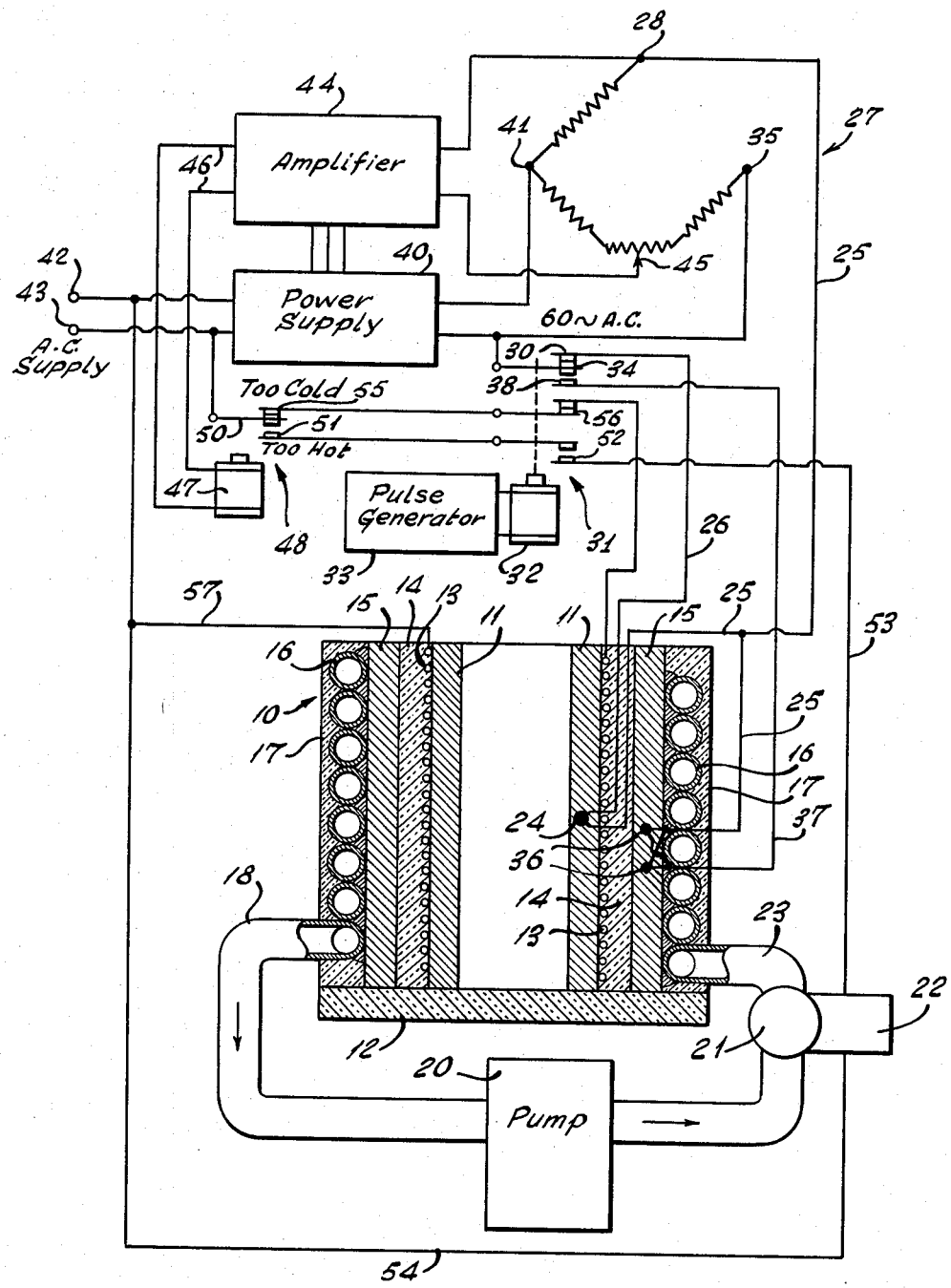

3,143,167
Patented Aug. 4, 1964

3,143,167
TEMPERATURE CONTROLLED ENCLOSURE
FOR TESTING PURPOSES
Adolf Vieth, Wanaque, N.J., assignor to Tung-Sol
Electric Inc., a corporation of Delaware
Filed May 19, 1961, Ser. No. 111,247
8 Claims. (Cl. 165—27)

This invention relates to automatic control of temperature, as for example the temperature of electrical components during testing. It has particular reference to a surface or enclosure which, by means of a single control circuit can be made to realize temperatures which differ widely from each other.

Constant temperature surfaces or enclosures for maintaining articles at a predetermined temperature are well known and have been used for many years. Most of these devices are arranged for a single specific temperature and the control systems used in conjunction with such devices are generally limited to adjustments within a narrow range of temperature values. The present invention, like prior art devices, is designed for maintaining a predetermined temperature. However, the flexibility of the device is so extended that a wide range of temperatures may be produced. Values of temperature may range from 60° C. below zero to 200° C. above, and rapid change from any temperature within this range to any other temperature is made possible.

One of the objects of this invention is to provide an improved temperature controlled surface or enclosure which avoids one or more of the disadvantages and limitations of prior art arrangements.

Another object of the invention is to maintain the temperature of objects at a predetermined temperature.

Another object of the invention is to change rapidly from one predetermined temperature to another for testing purposes.

Another object of the invention is to produce a wide range of temperature values for test purposes of objects subjected thereto.

Another object of the invention is to provide a single control unit which can be adjusted to maintain different temperature values at desired points.

The temperature control system of the invention includes a wall or surface provided with heating means therefor, a second wall or surface insulated from the heated wall or surface provided with cooling means therefor, temperature sensing means for each wall or surface and a bridge circuit coupled to the sensing means and adapted to alternately control the heating and cooling means.

For a better understanding of the present invention, together with other and further objects thereof, reference is made to the following description taken in connection with the accompanying drawing.

The figure shows a cross sectional view of an enclosure together with a schematic diagram of connections of the control circuit.

Referring now to the drawing, the enclosure 10 includes a cylindrical metal wall 11 within which electrical components to be tested may be placed. The bottom portion of the cylinder may be closed by an insulator disc 12 or a metal closure disc may be used. Surrounding the metal cylinder 11 is a heater comprising a winding 13 of resistance wire used for raising the temperature of the enclosure when high temperatures are desired. Surrounding the heater element is a layer of insulating material 14 which may be glass wool, asbestos, or any other well known insulating material. The insulator 14 is held in place by a second metal cylinder 15 which makes contact with the outer surface of the insulator and completely encloses its outer curved surface. The second metal cylinder 15 is surrounded by a coiled conduit 16 which may be made of copper tubing and which is preferably soldered or welded to the second cylinder 15 for purposes of rapid heat flow between the two. A second insulating cover 17 may surround the conduit but this is not necessary. The enclosure may be supplemented by an insulating cap or lid (not shown) but for most testing purposes the lid is not necessary.

Conduit 16 is for cooling the enclosure and for this purpose the end of the conduit may be connected to an exit pipe 18, a compression pump 20 for refrigeration means, and a valve 21 which can be opened and closed by a solenoid winding 22. An entrance pipe 23 connects the valve to the other end of the conduit 16. During normal operation of this device, when the valve is partly open, the pump 20 compresses a refrigerant which is first cooled and then applied to valve 21. The refrigerant passes through the valve and expands into the conduit 16 cooling it and the metal cylinder 15. The refrigerant is then collected by the pump through exit pipe 18 for continued operation of the system. Cooling systems of this type are well known and the details of the system need not be described here.

Instead of the recirculating system shown in the figure a tank of carbon dioxide or similar material may be used, with the tank connected to the valve 21 for discharge of the gas through the valve and through the conduit 16 for cooling purposes and thence into the atmosphere.

The temperature of the first metal cylinder 11 is sensed by means of a temperature sensitive element 24 which may be a thermistor or any other type of resistor which changes its resistance as the temperature is changed. The element 24 is connected by two conductors 25 and 26 to the control circuit. Conductor 25 is connected to the upper junction point 28 of a bridge circuit 27 while the other conductor 26 is connected to a contact point 30 which is part of a single-pole, double throw switch. The switch is operated by a relay 31 having a winding 32 connected to a pulse generator 33 which operates the relay 31 intermittently at a prearranged schedule. The pulse generator 33 is always connected to the relay winding and all the contacts of the relay are operated in continuous fashion regardless of the temperatures that exist in the enclosure. When the relay armature is in its normal position as shown by the drawing, contact 30 is connected to contact 34 and to the right hand junction point 35 of the bridge, and in this position thermistor 24 is connected between points 28 and 35.

The temperature of the second metal cylinder 15 is sensed by one or more thermistors 36. It has been found that for most applications, the temperature of the two cylinders 11 and 15 is such that similar thermistors present resistances which are in the ratio of one to two. For this reason it has been found convenient to employ two thermistors 36 connected in parallel in thermal contact with the second cylinder 15. If this is done, the combined resistances of thermistors 36 at the desired lower temperatures is approximately equal to the resistance of thermistor 24 at its desired higher temperature. Thermistors 36 are connected by means of conductors 25 and 37 to the common junction point 28 and to the lower contact point 38 of the single pole, double throw switch. When the pulse generator 33 actuates winding 32 and pulls the armature down the two thermistors 36 are connected between bridge junction points 28 and 35 in place of thermistor 24. From the above description it will be evident that the operation of relay 31 intermittently switches thermistor 24 and thermistors 36 into and out of the bridge circuit.

The bridge 27 is connected to a power supply 40 and receives 60 cycle alternating current applied to junction points 35 and 41. The power supply 40 receives its power from input terminals 42 and 43 which are to be connected to any convenient source of alternating current power. The opposite junction points of bridge 27 are connected to the input terminals of an amplifier 44 which amplifies the error signal which exists between points 28 and 45 and applies this signal to output conductors 46 which are connected directly to winding 47 of an output relay 48. Amplifier 44 in addition to amplifying the input signal is a phase sensitive circuit and transmits an output signal only when the bridge 27 is unbalanced in one direction. This unbalance condition is realized when thermistor 24 senses a temperature which is greater than desired, that is, the temperature within the enclosure is too hot. When this condition exists, amplifier 44 sends a signal to relay 48 and the armature 50 of the relay is actuated, connecting one side of the power supply to contact 51 and completing a circuit which passes through intermittently closed contacts 52 to send current over conductor 53 to solenoid 22, conductor 54, and back to the other side of the supply line. This action opens the normally closed valve 21 and sends cooling liquid through entrance pipe 23, conduit 16, and out the exit pipe 18, thereby cooling the second cylinder 15 and also reducing the temperature of the first metal cylinder 11 by increasing the temperature gradient between the two cylinders.

If the resistance of thermistor 24 is too low there will be no signal transmitted by amplifier 44 to the relay winding 47 and the relay armature 50 will remain in its normal position, sending current from one side of the power supply to armature 50, contacts 55, intermittently closed contacts 56, heater winding 13, and back to the other side of the power supply by means of conductor 57. This circuit sends current through the heater winding and raises the temperature of cylinder 11 and thermistor 24 until a bridge balance is again obtained.

It will be obvious from the above description that a double balance results from the action of relays 31 and 48. Thermistors 34 and 26 are alternately switched into the bridge circuit at a predetermined rate, and the amplifier sends a output signals to relay winding 47 at the same rate, operating armature 50 and either sending current through the heater winding 13 or opening the valve 21 to cause cooling of the second metal cylinder 15. These two actions are independent of each other and both circuits may be energized during a start-up period to create a temperature gradient between the two cylinders or either circuit may be independently operated to make cylinder 11 hotter or cylinder 15 colder.

Because two temperatures are maintained in the enclosure structure, one hot and the other cold, it is easy to so shift from a high temperature to a low temperature by adjustment of contact 45 on the bridge and thereby cut off the heating current and increase the flow of cooling fluid through the conduit 16. When the temperature is to be shifted from a low value to a high value, the heating winding 13 will remain on and the valve 21 will remain closed thereby causing fast heating until the required temperature is obtained.

The temperature of the first cylinder 11 must be maintained accurately at the desired value. However, the temperature of the second cylinder 15 is not critical, the only requirement being that a considerable temperature gradient be maintained between the two cylinders.

The invention has now been described in connection with the presently preferred embodiment thereof. Obviously various changes could be made without departure from the spirit of the invention or the scope of the accompanying claims. For example, although it is preferred to employ a single controller for both high and low temperature control as the number of components is thus substantially reduced, separate controllers could be employed if desired, in which case the switching means comprising the pulse generator and switches controlled thereby would be eliminated. Although the invention has been illustrated as employed for control of the temperature within an enclosure, obviously the invention could equally well be employed for producing any temperature controlled surface whether flat, concave or cylindrical or whether an interior or exterior surface.

Other variations within the scope of the claims will occur to those skilled in the art.

I claim:

1. A temperature controlled enclosure comprising, a first metal wall surrounding the enclosure space, a heating means in thermal contact with said first wall for raising the temperature of the enclosure, a second metal wall surrounding the heating means, cooling means in thermal contact with said second wall for lowering the temperature of the enclosure, a first temperature-sensitive element in thermal contact with said first metal wall, a second temperature-sensitive element in thermal contact with said second metal wall, and a control circuit connected between said elements and said heating and cooling means for energizing the heating and cooling means selectively to produce a desired temperature within the enclosure, said control circuit including a bridge, an amplifier, and a switching means for connecting the heating means to a source of power when said first temperature-sensitive element is connected to the bridge and for activating the cooling means when said second temperature-sensitive element is connected to the bridge.

2. A temperature controlled enclosure comprising, a first heat conductive wall surrounding the enclosure space, a heating means in thermal contact with said first wall for raising the temperature of the enclosure, a second heat conductive wall surrounding the first, cooling means in thermal contact with the second wall for lowering the temperature of the enclosure, a first temperature-sensitive element in thermal contact with said first wall, a second temperature-sensitive element in thermal contact with said second wall, and a control circuit connected between said elements and said heating and cooling means for energizing the heating and cooling means selectively in response to the condition of said elements for maintaining a desired temperature within the enclosure, said control circuit including a bridge and switching means for intermittently connecting the heating means to a source of power when said first temperature-sensitive element is connected to the bridge and for activating the cooling means when said second temperature-sensitive element is connected to the bridge.

3. A temperature controlled enclosure as claimed in claim 2 wherein a space is provided between said first and second heat conductive walls.

4. A temperature controlled enclosure as claimed in claim 3 wherein said space between walls is filled with a material having low heat conductivity.

5. A temperature controlled enclosure as claimed in claim 3 wherein said heating means is a resistance wire connected to a source of electrical power.

6. A temperature controlled enclosure as claimed in claim 3 wherein said cooling means is a conduit containing a fluid which has been released through a controlled valve.

7. A temperature controlled enclosure comprising, a first metal wall surrounding the enclosure space, a coil of resistance wire wound around said first wall and in thermal contact therewith for raising the temperature of the enclosure, a space surrounding the coil of resistance wire and filled with an insulating material having low heat conductivity, a second metal wall surrounding the insulating material, a cooling means in thermal contact with said second wall for lowering the temperature of the enclosure, a first resistor element in thermal contact with said first metal wall, a second resistor element in contact with said second metal wall, both of said resistors having resistances which vary with the temperature, and a control circuit connected between said resistors and said heating and cooling means for controlling the temperature of the enclosure, said control circuit including a bridge, a phase sensitive amplifier, and two switching means, one of said switching means arranged for alternately connecting said first and second resistors into and out of the bridge, the other of said switching means controlled by the output of the amplifier and arranged for selective control of the coil of resistance wire and of said cooling means.

8. A temperature controlled enclosure as claimed in claim 7 wherein said cooling means includes a solenoid operated valve for regulating the flow of a cooling fluid under pressure.

References Cited in the file of this patent

UNITED STATES PATENTS

| | | |
|---|---|---|
| 2,424,305 | Davis | July 22, 1947 |
| 2,508,988 | Bradley | May 23, 1950 |
| 2,549,569 | Bradley | Apr. 17, 1951 |
| 2,645,461 | Brown et al. | July 14, 1953 |
| 2,987,300 | Greene | June 6, 1961 |